United States Patent [19]

Murray

[11] Patent Number: 4,873,837

[45] Date of Patent: Oct. 17, 1989

[54] DUAL EVAPORATOR AIR CONDITIONER

[75] Inventor: Theodore L. Murray, Xenia, Ohio

[73] Assignee: Chrysler Motors Corporation, Highland Park, Mich.

[21] Appl. No.: 252,474

[22] Filed: Oct. 3, 1988

[51] Int. Cl.$^4$ .............................................. F25B 5/00
[52] U.S. Cl. .................................... 62/199; 62/228.3; 62/244; 137/528
[58] Field of Search ............. 62/244, 199, 200, 228.3; 137/528; 251/65

[56] References Cited

U.S. PATENT DOCUMENTS

| | | | |
|---|---|---|---|
| 2,481,605 | 9/1949 | MacLeod | 62/200 |
| 2,604,761 | 7/1952 | Atchison | 62/199 X |
| 2,949,931 | 8/1960 | Ruppright | 137/528 |
| 4,262,496 | 4/1981 | Bell, Jr. | 62/199 X |
| 4,637,220 | 1/1987 | Sakano | 62/200 |
| 4,691,527 | 9/1987 | Skeda | 62/199 X |

Primary Examiner—William E. Tapolcai
Attorney, Agent, or Firm—Kenneth H. MacLean, Jr.

[57] ABSTRACT

This application concerns an automobile air conditioning system having two evaporators and one compressor which is alternately activated and deactivated to prevent frost from accumulating on one of the evaporators by way of a refrigerant pressure responsive switch at the outlet of the one evaporator. A one-way check valve is located near the switch and between the evaporators to prevent reverse flowing of refrigerant from the one evaporator to the other evaporator.

2 Claims, 1 Drawing Sheet

U.S. Patent
Oct. 17, 1989
4,873,837
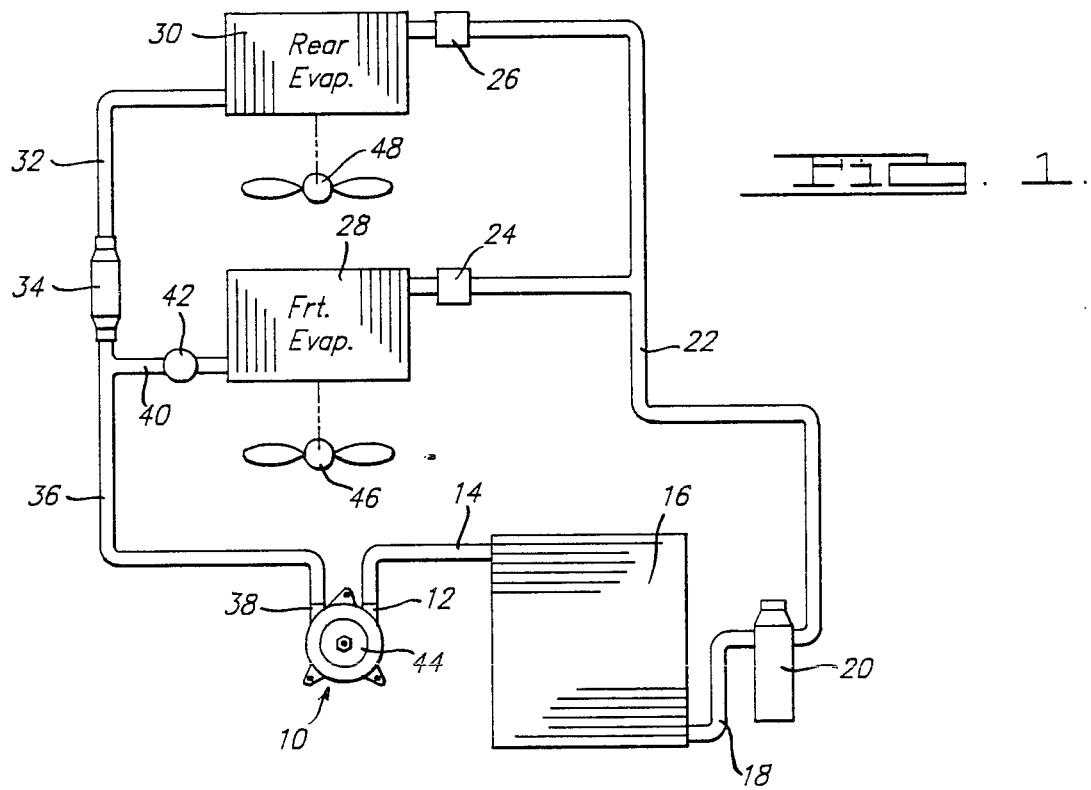
FIG. 1.
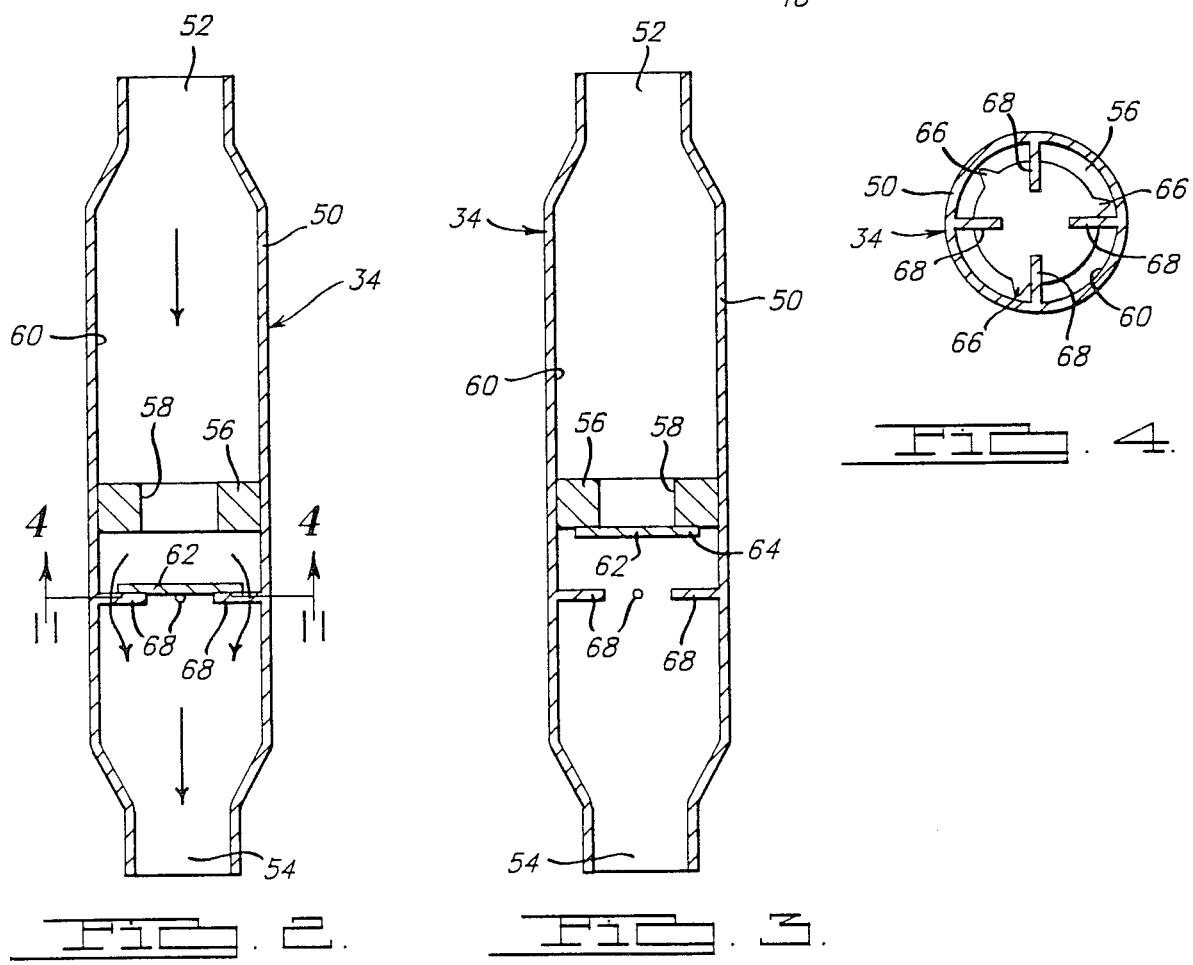
FIG. 2.
FIG. 3.
FIG. 4.

DUAL EVAPORATOR AIR CONDITIONER

BACKGROUND OF THE DISCLOSURE

In the past, single compressor and dual evaporator automobile air conditioning systems have been used. These systems typically used a thermally responsive expansion valve and a suction throttling type flow control valve for regulating refrigerant flow and to maintain evaporator pressures sufficiently high to prevent frost accumulation on the evaporators. These suction throttling valves are expensive and often two were used in the dual evaporator systems. In a modern automobile air conditioning system a simple orifice or capillary type expander is used in place of the thermal expansion valve and a refrigerant pressure responsive switch to alternate compressor activation and deactivation is used in place of the suction throttling valve.

A current Ford Motor Company vehicle has a single compressor and dual evaporator air conditioning system using a refrigerant pressure switch for cycling the compressor off and on. A first evaporator is located in the forward portion of the automobile interior and a second evaporator is located in the rearward portion. The control switch to cycle the compressor is associated with the first evaporator. One fan is provided for each evaporator to pass air through and over the evaporator's surfaces.

The above described air conditioning system performs satisfactorily when both fans are active because the refrigerant pressure in each evaporator is substantially equal under this operative condition. However, a problem develops when the operator of the automobile elects an air conditioning mode in which the rear fan is off while the front fan is on. In this operative mode, the capillary type flow control allows some refrigerant flow into the rear evaporator while no air is passed over the evaporator's surfaces due to the inoperative fan. Resultantly, a very low temperature and pressure is created in the rear evaporator.

When the refrigerant pressure responsive switch senses a predetermined low refrigerant pressure near the outlet of the front evaporator, the switch deactivates the compressor as planned and expected. Thereafter, the very low pressure which is generated in the rear evaporator causes refrigerant to immediately start to flow from the outlet of the front evaporator into the conduit leading to the rear evaporator. This reverse flow further lowers the refrigerant pressure about the switch and fools the switch into unduly prolonging the next reactivation of the compressor. Meanwhile, a continuing stream of warm air from the automobile interior passes through the front evaporator and warms its surfaces so that the discharge temperature of air is undesirably high. Resultantly, a vehicle occupant is made uncomfortable by the large "swing" or temperature gradient between the lowest and the highest temperature discharged from the front evaporator.

The solution used by Ford to solve this potential problem is to locate a shut-off valve in the refrigerant conduit or line which feeds liquid refrigerant to the rear evaporator. This valve then positively blocks flow to the rear evaporator whenever the rear fan is not activated. As a consequence, the very low refrigerant temperature and pressure previously identified is not generated in the rear evaporator. However, there is still a significant volume in the relatively long rear suction conduit into which refrigerant will flow when the rear fan is turned off. Thus this fix only partially solves the back flow problem and the electrically controlled positive shut-off valve is costly.

SUMMARY OF THE INVENTION

The previous background discussion has identified the closest prior art which is known to applicant. In contrast to the prior art, the applicant has discovered a solution to the previously stated problem which is both less complex while being more effective and more cost effective. Applicant's dual evaporator and single compressor air conditioning system, like the prior art, has a refrigerant pressure responsive compressor activating/deactivating switch.

Applicant's improved air conditioning system provides a one-way flow check valve located fluidly between the front evaporator and the rear evaporator. The valve allows refrigerant to flow to the compressor from the rear evaporator whenever the refrigerant pressure at the outlet of the rear evaporator is greater than the suction pressure downstream of the check valve or near the outlet of the front evaporator. Thus the check valve passes refrigerant from the rear evaporator to the compressor when the rear fan is operative. But when the rear fan is inoperative and resultantly the refrigerant pressure of the rear evaporator is excessively low, the check valve prevents a reverse flow to the rear evaporator from the vicinity of the switch. This reverse flow would otherwise occur due to the higher pressure near the outlet of the front evaporator particularly after the switch deactivates the compressor. Resultantly, this prevention of reverse flow permits the switch to accurately sense refrigerant at pressures which reflect the pressure and temperature conditions of the front evaporator.

The one-way check valve which applicant proposes may be a simple device using a steel plate which overlies an apertured base mounted in an enclosure for blocking flow. Means to limit movement of the steel plate are proposed when the check valve is in an open condition. To provide a positive blocking action and do away with the need for a spring, it is also proposed that the apertured base be of magnetic material. The positive effect of the magnet on the steel plate should also prevent any vibrational movements of the plate and resultant chatter.

Further advantageous features of applicant's system and valve than described above will be more readily apparent from a reading of the following detailed description of a preferred embodiment, reference being made to the drawings of the preferred embodiment.

FIG. 1 is a schematic layout of the subject dual evaporator air conditioning system; and FIG. 2 is a sectioned view of the check valve in FIG. 1 in an open mode of operation occurring when the rear evaporator and fan assembly is operative; and FIG. 3 is a sectioned view of the check valve in a closed mode of operation occurring when the rear evaporator and fan assembly is inoperative; and FIG. 4 is a sectioned view of the check valve taken along section line 4—4 in FIG. 2 and looking in the direction of the arrows.

DESCRIPTION OF A PREFERRED EMBODIMENT

In FIG. 1, a schematic illustration of applicant's single compressor and dual evaporator air conditioning system is shown. A refrigerant compressor 10 has an outlet fitting attached to a conduit 14. Conduit 14 in turn is connected to the inlet of a condenser 16. The condenser's outlet is connected by a conduit 18 to a receiver device 20. The receiver 20 is connected by a conduit 22 to capillary type flow control valves 24 and 26. The valves 24 and 26 are located adjacent the inlets of a front evaporator 28 and a rear evaporator 30, respectively. The outlet of the rear evaporator 30 is connected by a discharge conduit 32 which extends forward in the automobile and is fluidly attached to an inlet of a check valve 34. The outlet of the check valve 34 is connected to a suction conduit 36 which extends to and is connected to the inlet fitting 38 of the compressor 10. The outlet of the front evaporator 28 is fluidly connected by a branch conduit 40 of the suction line 36. A refrigerant pressure sensing switch 42 is located adjacent the outlet of the front evaporator for alternately activating and deactivating the compressor in the manner previously explained.

As is conventional in modern automobile air conditioning, the compressor 10 is driven by a pulley 44. Likewise, this pulley input drive is connected to a compressor shaft and the internal pumping parts by an electromagnetic clutch. This drive arrangement is in accord with current production practice so details are not illustrated. The refrigerant pressure switch also is in current use on Chrysler Motors automobiles to activate and deactivate the compressor clutch so details of its construction are omitted. Electric circuit and connector means from a vehicle battery and between the switch 42 and the clutch on compressor 10 are also omitted as these are fairly conventional.

In addition to the above described apparatus, fans 46 and 48 are located with respect to the front and the rear evaporators so that air may be made to pass over the surfaces of the evaporators and into the automobile interior for cooling the occupants. Each fan is driven by a small electric motor which is not shown but represents conventional air conditioning design. For maximum flexibility, each of the fans is separately activated and deactivated by the front seat occupant of the automobile. If the automobile has passengers in the rear area, the rear fan 48 is normally activated in addition to the front fan 46. However, if only the front seat is occupied, the rear fan may be deactivated.

As previously discussed, the above described operation of the air conditioning system creates a potential for a reverse flow of refrigerant which is undesirable. Applicant solves this problem and prevents any reverse flow. In FIGS. 2-4, the internal details of the one-way flow control or check valve 34 are shown. The valve has a thin walled tubular housing 50 with reduced diameter inlet and outlet end portions 52, 54. The midportion of housing 50 supports a seat base or annulus 56 with central aperture 58 defined thereby. The seat base 56 is supported in housing by a press fit with the inner surface 60. In a preferred embodiment, the annulus is made of a magnetic material.

The housing 50 also supports a movable valving element in the form of a generally flat steel plate 62. The plate 62 is sized and positioned so that its peripheral edge portion 64 engages the base 56 when the plate is in the closed position shown in FIG. 3. In the closed position, the plate 62 is magnetically held to the base 56. The plate 62 has a diameter or outer edge dimension smaller than the interior dimension of the housing 50 so that refrigerant can readily flow around the peripheral edge 64 thereof when in the opened position as in FIG. 2. The plate 62 also has a plurality of radially extending tabs or spacers 66 which center the plate 62 in the housing 50, as best shown in FIG. 4. For the purpose of limiting the opening movement of the plate 62 away from the base 56, a plurality of inwardly extending pins or other form of projections 68 are provided.

From the description above, it can be readily understood how the check valve 34 functions to prevent the undesirable reverse flow of refrigerant from the area near the switch 42 to the rear evaporator. When the refrigerant pressure in conduit 32 is less than the pressure in conduit 36, the pressure differential and the magnetic force of base 56 on the plate 62 moves it into the reverse flow blocking position of FIG. 3. When the refrigerant pressure in conduit 32 is greater than the pressure in conduit 36, the pressure differential moves the plate 62 to the open position of FIG. 2.

Although only one embodiment has been shown in the drawing and discussed in detail above, it is clear that some modifications may be made to the system and apparatus which would still fall within the description of the invention as defined in the following claims.

I claim:

1. In an automobile having an interior with forward and rearward portions to be cooled, an improved air conditioner including two evaporators for cooling, the evaporators being widely spaced from one another, one being located in the forward portion of the interior and one being located in the rearward portion of the interior to selectively permit either simultaneous or separate cooling of the forward and rearward portions; a refrigerant compressor for pumping refrigerant to the two evaporators, the compressor being located near the forward evaporator and widely spaced from the rearward evaporator; each evaporator having a selectively energized fan mean which passes air over the evaporator's outer cooling surface respectively; an elongated suction conduit which extends longitudinally of the automobile from the rear evaporator to the compressor for returning refrigerant thereto; a relatively short conduit extending from the forward evaporator to the suction conduit and interconnected thereto for the return to the compressor of refrigerant discharged from the forward evaporator; control means to alternately activate and deactivate the compressor in response to the refrigerant pressure discharged from the forward evaporator for the purpose of maintaining the related temperature of the outer surface of the forward evaporator above a frost producing low temperature and below a noticeably uncomfortable high temperature in the forward portion of the automobile interior, the low temperature related indicator initiating compressor deactivation and the higher temperature related indicator initiating compressor activation; a one-way refrigerant flow check valve in flow control relation to the rear evaporator suction conduit for allowing only a flow from the rear evaporator to the compressor, the check valve being positioned just upstream from where the short conduit leading from the forward evaporator connects to the rear suction conduit so that refrigerant which is discharged from the forward evaporator is prohibited from flowing to the rearward evaporator whereby such reverse flow would otherwise occur whenever the rear fan means is inactive and the compressor is deactivated causing an undesirable decrease in the refrigerant pressure which the compressor control would falsely interpret and thus delay the reactivation of the compressor resulting in a blast of higher temperature air from the forward evaporator than is desired.

2. The improved air conditioner as set forth in claim 1 in which the check valve has a generally hollow housing, an annular seating base extending across the housing interior and with a central aperture therethrough, a steel valve which is moveable towards and away from the apertured base in response to changes in a refrigerant pressure differential on opposite sides of the valve; the seating base being magnetic so that the steel valve is urged against the seating base and across the central aperture to block a reverse refrigerant flow from the forward evaporator, through the rear suction conduit and to the rear evaporator when in a closed position but movable away from the seating base and the central aperture to permit refrigerant flow through the central aperture when in an opened position.

* * * * *